Aug. 11, 1925.

A. ROHRBACH 1,549,689

CONNECTION FOR AIRPLANE WINGS

Filed June 10, 1924    2 Sheets-Sheet 1

Inventor
Adolf Rohrbach
By Chas H Keel
His Atty

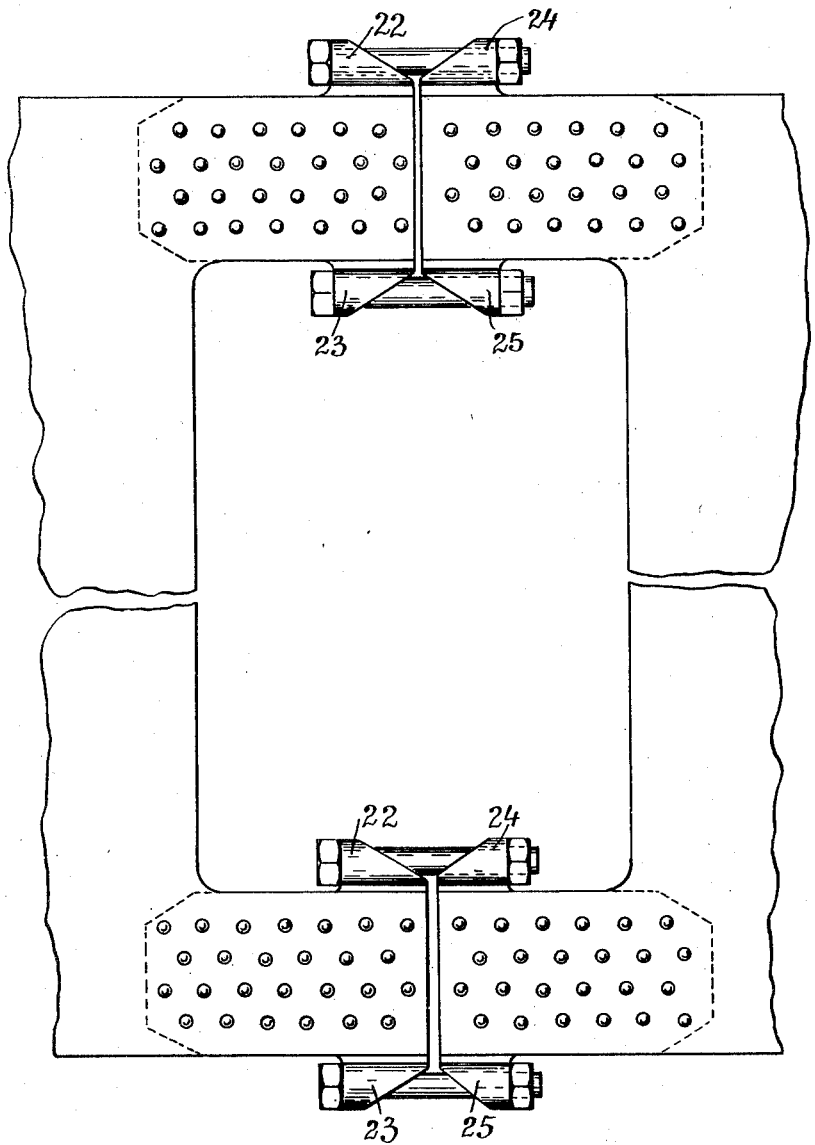

Patented Aug. 11, 1925.

1,549,689

UNITED STATES PATENT OFFICE.

ADOLF ROHRBACH, OF BERLIN-WILMERSDORF, GERMANY.

CONNECTION FOR AIRPLANE WINGS.

Application filed June 10, 1924. Serial No. 719,105.

*To all whom it may concern:*

Be it known that I, ADOLF ROHRBACH, a citizen of the German Empire, Ruhrstrasse 12, Berlin-Wilmersdorf, Germany, have invented Connections for Airplane Wings, of which the following is a specification.

The connection of the wings to the fuselage or the cabane of the airplane has been at all times a difficult matter to deal with. To overcome those difficulties has proved to be a much harder task with airplanes with cantilever wings than with braced aircraft. The fact, that the height which is available for the structure should not surpass certain limits renders the problem even more difficult, considering that the connection is called to take up considerable forces or moments of such forces, the condition being that its actual weight remains the smallest possible.

There is a great variety of forces working at such connections. Not only tensile, compressive, torsion or shearing forces, but bending and transverse forces appear, acting in most cases as moments, not as forces. The result is a considerable increase of stress.

If considerable forces have to be transmitted with a low actual weight of the transmission-parts, it is important that any eccentric or one-sided position of the connections be avoided. Up to now fittings have been used, which, as shackles or butt-strap-fittings encircle the upper or lower girder of a spar, joining same with the corresponding part. The transverse force is disregarded in any such constructions, though experience has taught that most wing-breaking occurs through this force.

Figure 1:
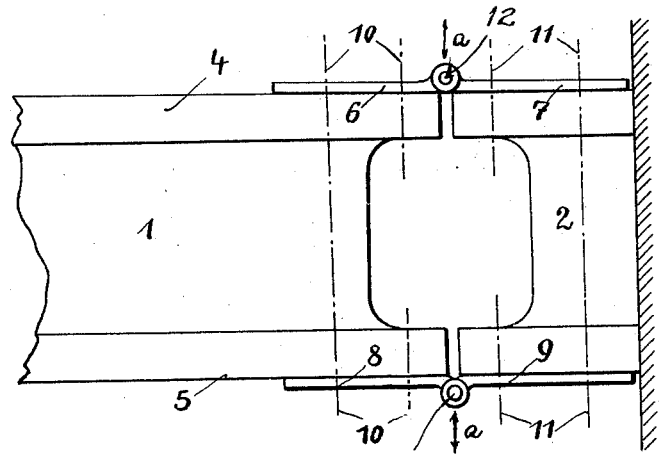
Figure 2:
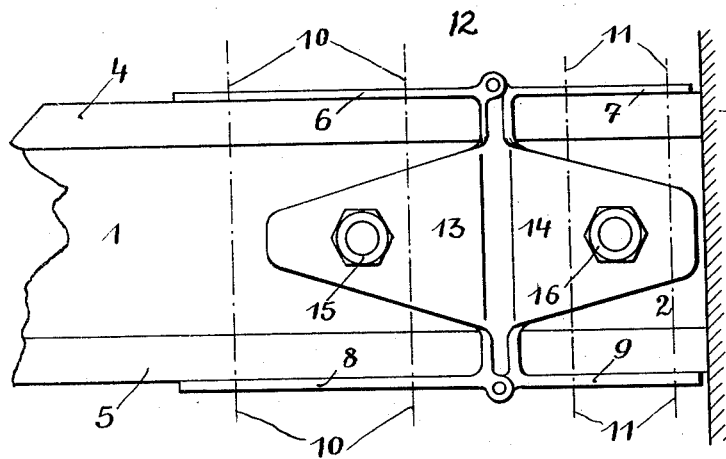
Figure 3:
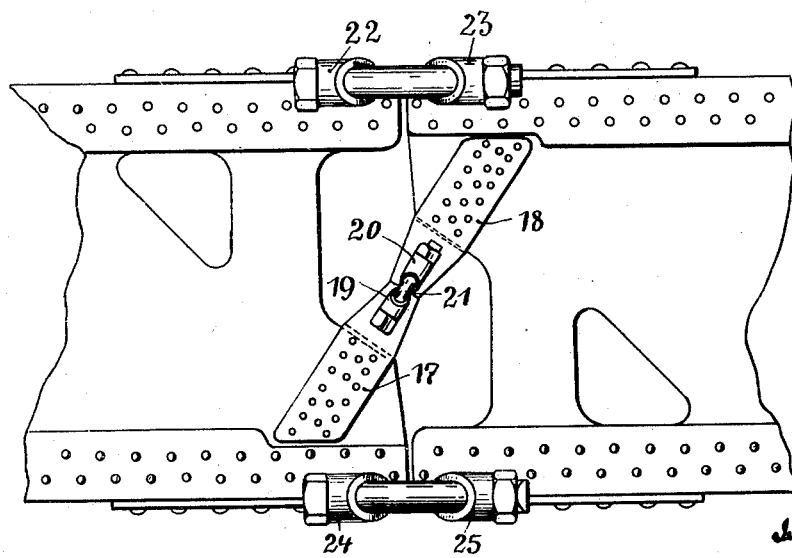

To explain this in detail the here attached drawing shows both designs, the old and the new one, wherein:—Fig. 1 a standard fitting (diagrammatical illustration) Fig. 2 a similar fitting, somewhat improved (diagrammatical illustration) Fig. 3 a fitting according to this application (side elevation) Fig. 4 same fitting as Fig. 3 (plan view).

If a spar 1 of an airplane shall be connected to the connection-part 2 of—for instance—a fuselage 3, the upper and lower girder 4, 5 of the spar 1 are connected by means of fittings 6, 7 and 8, 9 with the connection-part 2. Those fittings 6, 7 and 8, 9 are split, each part being connected by means of bolts 10, 11 with the upper or lower girder and the connection-part 2. The transverse force acts in the direction of the arrow *a*. Considerable difficulties come through the bending stress of the fitting, because the transverse force is transmitted with a lever-arm equal to the distance of the first bolt 10 or 11 from the bolt 12, joining the two parts of the fitting.

The fitting, to resist this additional bending-moment, must be of such substantial construction, that its weight has no adequate proportion to its real purpose of connecting two spar stumps. Since the local stress of the spar, round the fastening-bolt 10 or 11 is extremely high, the spar can resist any stresses only if much weight is sacrificed with regard to the additional bending moments.

To eliminate this difficulty the fittings of the upper and lower girder were connected with a vertical stiffening rib 13 (Fig. 2). Bolts or rivets with shearing stress pass through this rib. The above described form of fittings is used up to this day; one likes to give them the shape of a shoe or a casing. In all these cases the bolts or rivets, situated next to the wing-base, will have to carry the principal part of the transverse force, so that they would have to endure either an overstress, or else would have to be constructed particularly strong.

This invention absolutely eliminates the above mentioned difficulties. The Figures 3 and 4 show a fitting, constructed according to this application. A special diagonal is provided for transmitting the transverse force. This diagonal consists of two parts 17, 18 which are connected by two fittings 19, 20 by means of the bolt 21.

The fittings 22, 23, 24, 25 serve for the transmission of the girder forces exclusively, so that the work of the diagonal 17, 18 consists in transmitting the transverse force.

The fittings may be adapted completely to the spar-construction, avoiding too great bending-moments in themselves or in the wing-stumps or the spars. The inclination of the diagonal 17, 18 can be chosen at will, depending each time on the conditions of construction exclusively. There is even no objection against the oblique diagonal being replaced by a vertical post with subdivision; a corresponding fitting being provided for connection. In certain cases it will be profitable to design this transverse force diagonal as spatial diagonal, i. e. connecting the upper side of the front spar to the under side of the rear spar or vice versa.

Let us dwell upon another advantage of this invention: when connecting a wing to a fuselage or other wing part by two spar stumps according to this application, only 6 structural members—f. i. 4 girders and 2 diagonals or posts—have to be arranged. Thus it is possible to compute the transmission-forces of every connecting-part with absolute correctness, since 6 stays must be provided for the statically determined connection of two rigid bodies.

Though the invention is of greatest value for cantilever wings, there is no objection to its being used as well for the braced wings of a bi-plane or for monoplane-wings supported by struts or cables from outside.

Finally this invention is applicable for fastening other light surfaces exposed to wind in their fastening-points.

Claims.

1. In an airplane, a wing structure, a part to which the wing structure is joined, and a connection therebetween including means for transmitting the transverse forces.

2. In an airplane, a wing structure girder, a part to which the wing girder is joined, and a connection therebetween including means for transmitting the girder forces and a special member for transmitting the transverse forces.

3. An airplane wing structure of the character set forth in claim 1 wherein the means for transmitting the transverse forces includes a diagonal stay member between the wing structure and the joined part.

4. An airplane wing structure of the character set forth in claim 1 wherein the means for transmitting the transverse forces includes a part joined to the connected parts by means of suitable shackles.

5. A wing connection for airplanes including means for transmitting the normal girder forces and a special connecting part for resisting the transverse forces.

6. In an airplane, a wing structure including a spar stump part, a corresponding part to which the stump is joined and a connecting member therefor rigidly connected at one end with the upper portion of one of said parts and at its other end with the lower portion of the other of said parts.

7. In an airplane, a wing structure including a spar stump part, a corresponding part to which the stump is joined, a connecting member for joining the two parts end wise together, and a second connecting member therefor rigidly connected at one end with the upper portion of one of said parts and at its other end with the lower portion of the other of said parts.

8. In an airplane, a wing structure including a spar stump part having upper and lower girders, a corresponding part to which the stump is joined, connecting means joining the upper and lower girders to the upper and lower portions respectively of the corresponding part, and a connecting member therefor rigidly connected at one end with the upper portion of one of said parts and at its other end with the lower portion of the other of said parts.

In testimony whereof, I have signed my name to this specification.

Dated this 23rd day of May, 1924.

ADOLF ROHRBACH.